(12) United States Patent
Fong et al.

(10) Patent No.: US 11,625,111 B2
(45) Date of Patent: Apr. 11, 2023

(54) CONTROL METHOD FOR ELECTRONIC DEVICE

(71) Applicant: ASUSTEK COMPUTER INC., Taipei (TW)

(72) Inventors: Mu-Chern Fong, Taipei (TW); Wei-Chuan Chen, Taipei (TW); Chi-Rong Hsu, Taipei (TW); Po-Nien Chen, Taipei (TW); Lan-Hua Huang, Taipei (TW); Wen Hui Huang, Taipei (TW); Chi-Ming Huang, Taipei (TW); Zhong Wei Hong, Taipei (TW); Siao-Yun Yang, Taipei (TW); Hsiao Fan Chen, Taipei (TW); Hsiu-Yu Kao, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 17/573,240

(22) Filed: Jan. 11, 2022

(65) Prior Publication Data
US 2022/0229500 A1    Jul. 21, 2022

(30) Foreign Application Priority Data

Jan. 15, 2021   (TW) .................................. 110101525

(51) Int. Cl.
*G06F 3/0362* (2013.01)

(52) U.S. Cl.
CPC .................................. *G06F 3/0362* (2013.01)

(58) Field of Classification Search
CPC ......................................... G06F 3/033–03549
See application file for complete search history.

(56) References Cited

U.S. PATENT DOCUMENTS

| 8,223,127 | B2 | 7/2012 | Park et al. |
| 2003/0197740 | A1 | 10/2003 | Reponen et al. |
| 2005/0034081 | A1 | 2/2005 | Yamamoto et al. |
| 2011/0057957 | A1* | 3/2011 | Kasahara ............ G06F 3/03547 345/173 |

(Continued)

FOREIGN PATENT DOCUMENTS

| CN | 1296808 C | 1/2007 |
| CN | 104360802 A | 2/2015 |

(Continued)

*Primary Examiner* — Hang Lin
(74) *Attorney, Agent, or Firm* — Muncy, Geissler, Olds & Lowe, P.C.

(57) ABSTRACT

A control method is provided, applied to an electronic device. The electronic device includes a screen and a knob module. The control method includes: receiving a trigger signal to enable the knob module, and displaying an operating interface corresponding to the knob module on the screen according to the trigger signal, where the operating interface includes a plurality of functional regions that is arranged annularly, and the functional regions are configured to display a plurality of function options, where one of the functional regions shows a marked state; switching the functional region corresponding to the marked state according to a first input signal from the knob module; and selecting the functional region corresponding to the marked state according to a second input signal from the knob module.

9 Claims, 11 Drawing Sheets

(56) References Cited

U.S. PATENT DOCUMENTS

2016/0011735 A1    1/2016  Stoner et al.
2020/0227007 A1*   7/2020  Oi ........................ H04N 13/344
2021/0144429 A1*   5/2021  Liu ................. H04N 21/47202
2021/0318763 A1*  10/2021  Knoppert .............. G06F 3/0485

FOREIGN PATENT DOCUMENTS

| CN | 104866005 A | 8/2015 |
| CN | 108958499 A | 12/2018 |
| WO | WO-2009/023591 A2 | 2/2009 |

* cited by examiner

CONTROL METHOD FOR ELECTRONIC DEVICE

CROSS-REFERENCE TO RELATED APPLICATION

This application claims the priority benefit of Taiwan application serial No. 110101525, filed on Jan. 15, 2021. The entirety of the above-mentioned patent application is hereby incorporated by reference herein and made a part of the specification.

BACKGROUND OF THE INVENTION

Field of the Invention

The disclosure relates to a control method, and in particular, to a control method for an electronic device.

Description of the Related Art

With the development of science and technology, requirements of human machine interface are increasingly high. Compared with a key switch, a knob switch provides a user with more diversified operating modes, especially for a multi-option operation.

However, conventional human machine interfaces are mostly designed for a keyboard or a touch pad not designed for a knob switch, which causes the limitation while implement with knob switches.

BRIEF SUMMARY OF THE INVENTION

The disclosure provides a control method, applied to an electronic device including a screen and a knob module. The control method includes: receiving a trigger signal to enable the knob module, and displaying an operating interface corresponding to the knob module on the screen according to the trigger signal, where the operating interface includes a plurality of functional regions that arranged annularly, and the functional regions are configured to display a plurality of function options, where one of the functional regions shows a marked state; switching the functional region corresponding to the marked state according to a first input signal from the knob module; and selecting the functional region corresponding to the marked state according to a second input signal from the knob module.

By performing the control method provided in the disclosure, an operating interface displayed on a screen is used to clearly display options corresponding to a knob switch, to improve user experience while operating the knob switch.

DETAILED DESCRIPTION OF THE EMBODIMENTS

More detailed descriptions of specific embodiments of this application are provided below with reference to the schematic diagrams. The advantages and features of the disclosure are described more clearly according to the following description and claims. It should be noted that all the drawings use very simplified forms and imprecise proportions, only being used for assisting in conveniently and clearly explaining the objective of the embodiments of the disclosure.

Figure 1:
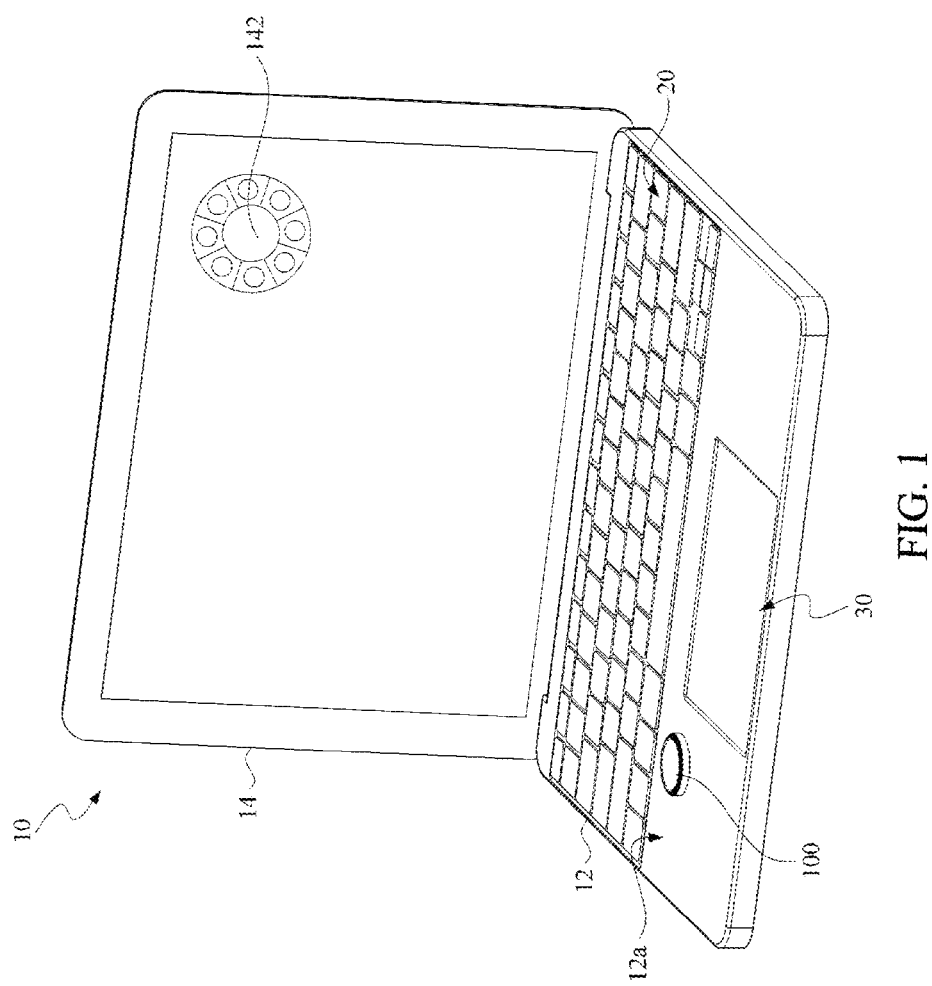
FIG. 1 is a schematic diagram of an electronic device using a control method according to the disclosure.
Figure 2:
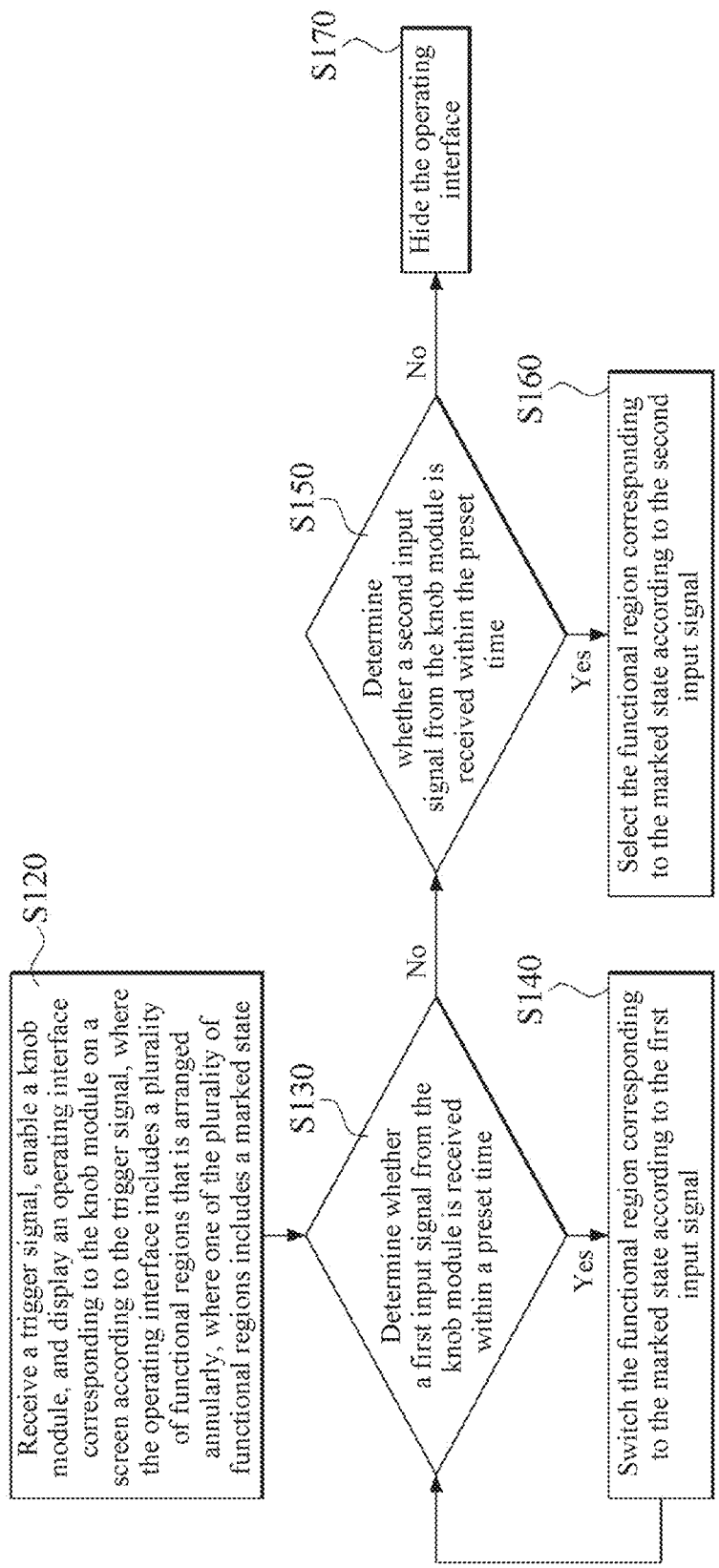
FIG. 2 is a flowchart of an embodiment of a control method according to the disclosure.

FIG. 1 is a schematic diagram of an electronic device using a control method according to the disclosure. FIG. 2 is a flowchart of an embodiment of a control method according to the disclosure. FIGS. 3A to 3D show an embodiment of an operating interface corresponding to the control method in FIG. 2.

Referring to FIG. 1, in an embodiment, an electronic device using the control method of the disclosure is a notebook computer, including a screen and a knob module.

As shown in the figure, the electronic device 10 includes a host 12 and a screen 14. The host 12 includes a working platform 12a. The working platform 12a is a main working position for a user to operate the electronic device 10. The electronic device 10 is equipped with a keyboard module 20, a touchpad 30, and a knob module 100 on the working platform 12a. The screen 14 is pivotally connected to the host 12, and is configured to display an operating interface 142 corresponding to the knob module 100.

The keyboard module 20 is a mechanical keyboard, an electronic keyboard, or a virtual keyboard. The touchpad 30 is a capacitive touchpad, a resistive touchpad, or an optical touchpad. The knob module 100 is located on a side of the keyboard module 20 facing the touchpad 30, that is, a lower side in the figure, to facilitate an operation of the user. In an embodiment, the knob module 100 is located on a left side of the touchpad 30.

Referring to FIG. 2, the control method of the disclosure includes the following steps.

First, as described in step S120, a trigger signal is received, the knob module 100 is enabled, and an operating interface 142 corresponding to the knob module 100 is displayed on the screen 14 according to the trigger signal. In an embodiment, the trigger signal is a rotating signal or a pressing signal from the knob module 100, an input signal from the keyboard module 20, or a touching signal from the touchpad 30. In another embodiment, the trigger signal is alternatively an input signal from a mouse or a joystick, or another external device.

Figure 3A:
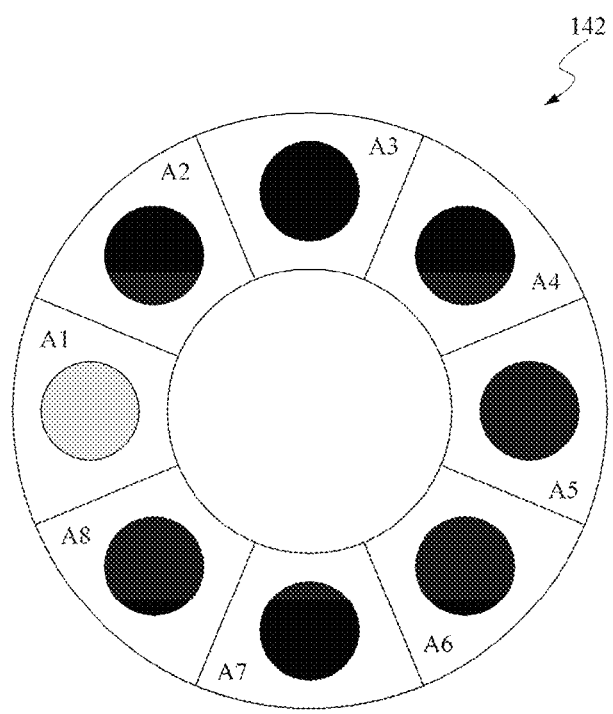
FIG. 3A to FIG. 3D show an embodiment of an operating interface corresponding to the control method in FIG. 2.

FIG. 3A shows an embodiment of the operating interface 142. As shown in the figure, the operating interface 142 includes a plurality of functional regions A1 to A8 that is arranged annularly, to simulate a shape of the knob switch. In addition, one (that is, the functional region A1 in the figure) of the functional regions A1 to A8 includes a marked state, in an embodiment, a lighted state or a color change. The functional regions A1 to A8 are configured to display a plurality of function options. In an embodiment, the functional regions A1 to A8 display icons corresponding to the function options for the user to determine and select.

In this embodiment, the operation of displaying a marked state in one of the functional regions A1 to A8 is performed while displaying the operating interface 142, but it is not limited herein.

In an embodiment, in step S120, the functional region A1 corresponding to the marked state is a preset region, in an embodiment, the first functional region A1 of the functional regions A1 to A8 that are arranged annularly, but it is not limited herein. In an embodiment, in step S120, the functional region corresponding to the marked state is a functional region corresponding to the marked state at an end of a previous operation, or a functional region finally selected in a previous operation.

Next, in step S130, to determine whether a first input signal from the knob module 100 is received within a preset time after the knob module 100 is enabled. In an embodiment, the first input signal is a rotating signal from the knob module 100.

When the first input signal is received within the preset time, the process proceeds to step S140, the functional region is switched corresponding to the marked state according to a first input signal from the knob module 100. After step S140 is performed, the process returns to the determining step S130. By repeating the foregoing steps S130 and S140, a user selects a to-be-executed function option.

Figure 3B:
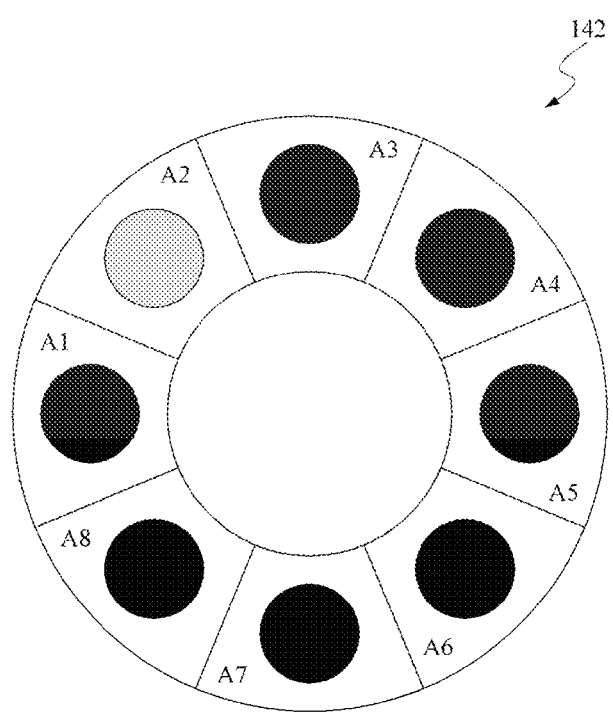

Referring to FIG. 3B, in an embodiment, when the received first input signal is a clockwise rotating signal, and other functional regions A2 to A8 exist in a clockwise direction of the functional region A1 originally corresponding to the marked state, the functional region A1 originally corresponding to the marked state restores an original state, and a next functional region A2 in the clockwise direction of the functional region A1 is in the marked state.

Similarly, when the received first input signal is a counterclockwise rotating signal, and another functional region A1 exists in a counterclockwise direction of the functional region A2 originally corresponding to the marked state, the functional region A2 originally corresponding to the marked state restores an original state, and a next functional region A1 in the counterclockwise direction of the functional region A2 is in the marked state.

When no other functional regions exist in a rotation direction of the first input signal, in the control method, alternatively, it is chosen not to switch the functional region corresponding to the marked state. In an embodiment, when the functional region originally corresponding to the marked state is the functional region A1, and the first input signal is a counterclockwise rotating signal, because no other functional region exists in a counterclockwise direction of the functional region A1, in the control method, the functional region A1 corresponding to the marked state is not switched.

When the first input signal is not received within the preset time, the process proceeds to a determining step S150, to determine whether a second input signal from the knob module 100 is received within the preset time after that. In an embodiment, the second input signal is a pressing signal from the knob module 100. In an embodiment, the preset time in the determining step S130 and the preset time in the determining step S150 are the same.

When the second input signal from the knob module 100 is received within the preset time, the process proceeds to step S160, to select a functional region corresponding to the marked state according to the second input signal, to execute the function option corresponding to the selected functional region. When the second input signal is not received within the preset time, the process proceeds to step S170, to hide the operating interface.

In an embodiment, the function options include a value adjustment option, in an embodiment, the function option corresponding to screen brightness and volume adjustment. When the functional region selected in step S160 corresponds to the value adjustment option, a value adjustment interface 144 corresponding to the knob module 100 is displayed on the screen 14, to replace an original operating interface.

Figure 3C:
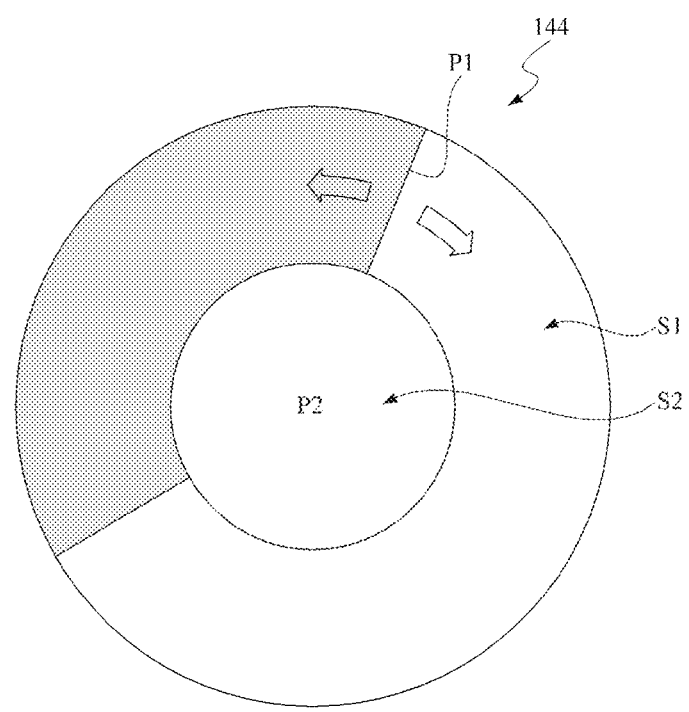

FIG. 3C shows an embodiment of the value adjustment interface 144. As shown in the figure, the value adjustment interface includes an annular region S1 and a central region S2. The annular region S1 includes an indicator P1. A user controls a position or a range of the indicator P1 in the annular region S1 by using the knob module 100, the touchpad 30, or the screen 14 that is touchable, to adjust a corresponding value. The central region S2 includes a return key P2. A user returns to the original operating interface by pressing the return key P2.

In an embodiment, multi-layer function options are provided in the control method of the disclosure, and the function options include a second-layer group option. The second-layer group option belongs to a first-layer function option, that is, the function options displayed in the foregoing functional regions A1 to A8. After a functional region corresponding to the second-layer group option is pressed, a plurality of second-layer function options is opened.

Figure 3D:
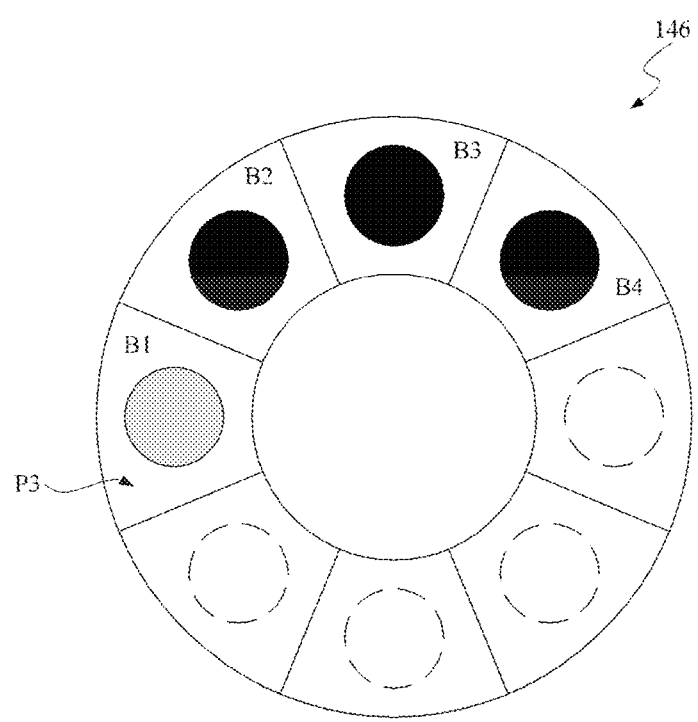

FIG. 3D shows an embodiment of an operating interface 146 of the second-layer function option. As shown in the figure, when the functional region selected in step S160 corresponds to the second-layer group option, a plurality of functional regions B1 to B4 arranged annularly that corresponds to the second-layer function option are displayed on the operating interface 146 for a user to select (there are only four second-layer function options in the figure, and therefore, four functional regions B1 to B4 are displayed for a user to select).

A manner of selecting the second-layer function options is similar to that described in step S120 to step S170. Details are not described herein again. In an embodiment, one of the functional regions B1 to B4 (in an embodiment, the functional region B1 in the figure) is used as a return key P3. A user presses the functional region B1 to returns to the operating interface 142 corresponding to the first-layer function option.

Figure 4:
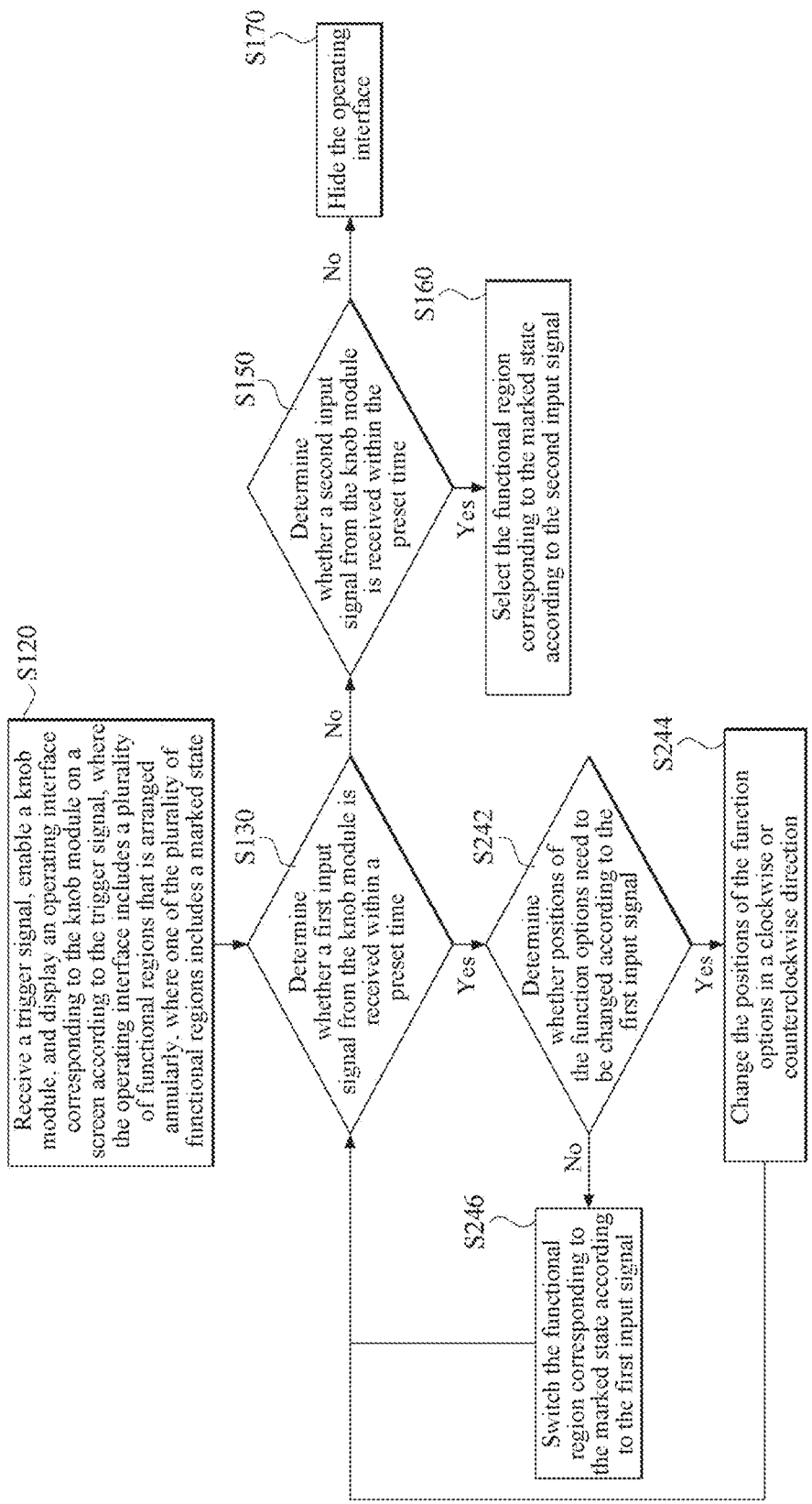
FIG. 4 is a flowchart of another embodiment of a control method according to the disclosure.
Figure 5A:
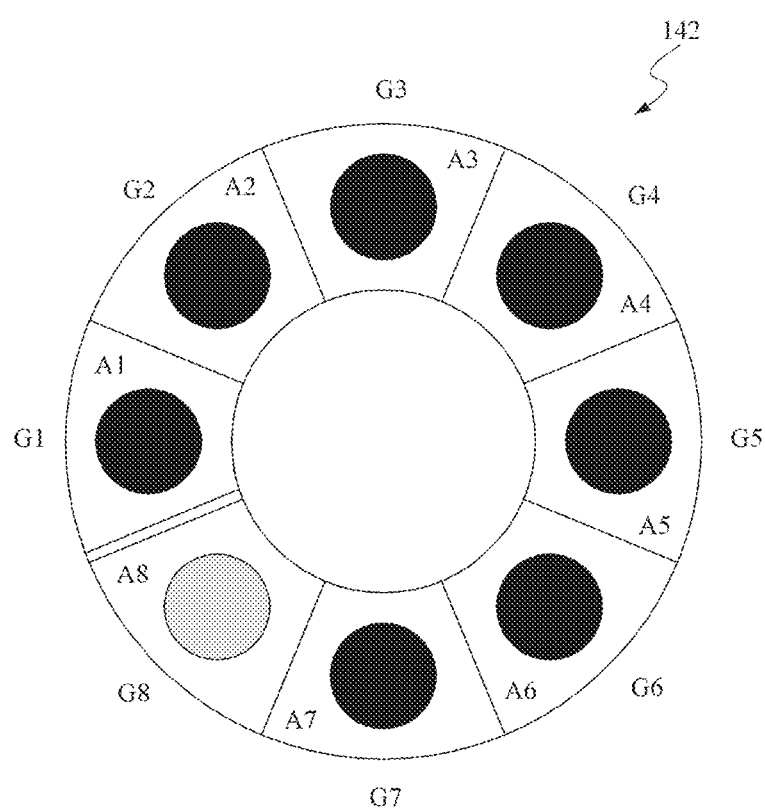
FIG. 5A and FIG. 5B show an embodiment of an operating interface corresponding to the control method in FIG. 4.
Figure 5B:
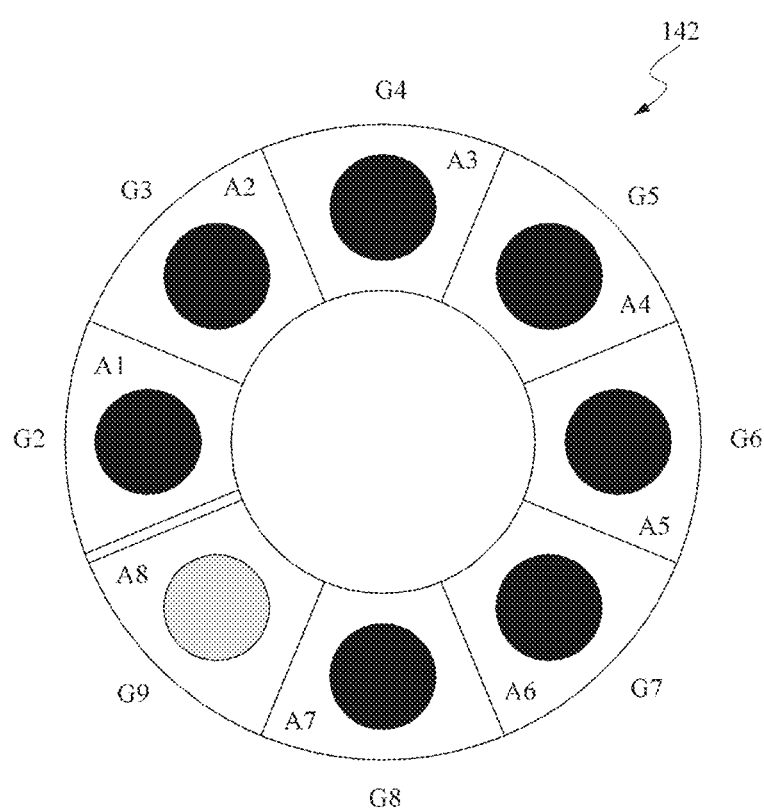
Figure 5C:
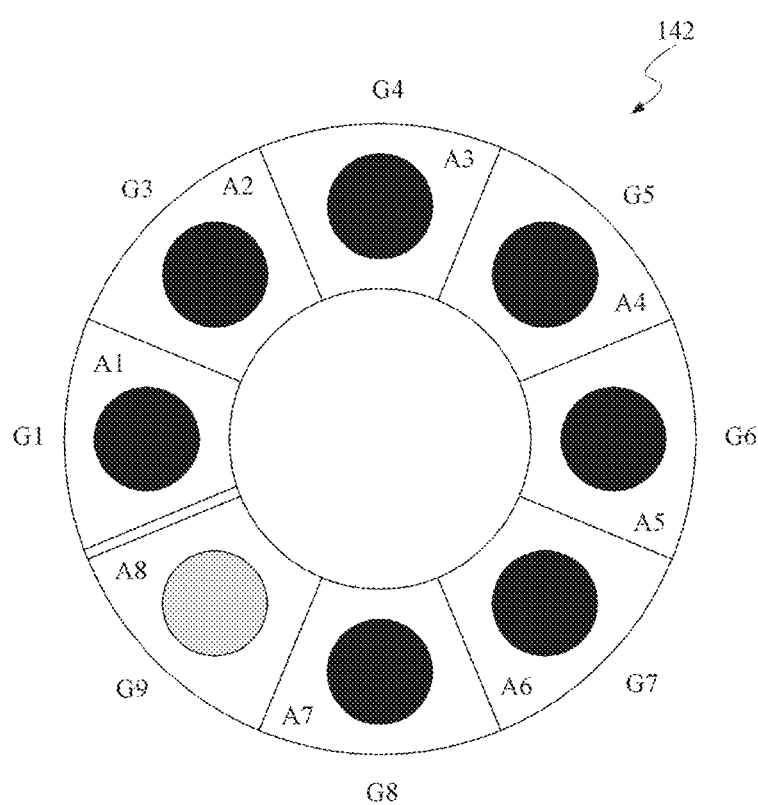
FIG. 5C shows another embodiment of an operating interface corresponding to the control method in FIG. 4.

FIG. 4 is a flowchart of another embodiment of a control method according to the disclosure. FIG. 5A and FIG. 5B show an embodiment of an operating interface corresponding to the control method in FIG. 4. FIG. 5C shows another embodiment of an operating interface corresponding to the control method in FIG. 4.

The control method of this embodiment is for a case in which a quantity of function options at a same layer is greater than a quantity of functional regions A1 to A8 previously displayed on the operating interface 142. Compared with the embodiment in FIG. 1, in the control method of this embodiment, step S140 in FIG. 1 is replaced with a determining step S242, step S244, and step S246. Other steps of this embodiment are substantially the same as those of the embodiment in FIG. 1.

In step S130, when the first input signal is received within the preset time, as described in step S242, the control method determines whether positions of the function options need to be changed according to the first input signal from the knob module 100.

When the positions of the function options need to be changed, as described in step S244, the positions of the function options are changed in a clockwise or counterclockwise direction. However, the functional region corresponding to the marked state is not changed.

When the positions of the function options do not need to be changed, as described in step S246, the functional region corresponding to the marked state is switched according to the first input signal. The foregoing step S246 is similar to step S140 in FIG. 1. Subsequent steps of this embodiment are similar to those of the embodiment in FIG. 1. Details are not described herein.

In an embodiment, referring to FIG. 5A and FIG. 5B, when a quantity of function options G1 to G9 at a same layer is greater than a maximum quantity of functional regions A1 to A8 simultaneously displayed on the operating interface, a functional region originally corresponding to a marked state is the last functional region (that is, the functional region A8 in the figure) arranged in a clockwise direction as displayed on the operating interface 142.

In this case, when the received first input signal is a clockwise rotating signal, as shown in FIG. 5B, positions of the function options G1 to G9 are changed in a counterclockwise direction while hiding some function options (that is, the function option G1 in the figure) located at a front end and displaying some function options that are not displayed on the operating interface 142 originally (that is, the function option G9 in the figure).

In the foregoing embodiment, descriptions are made by using the function options arranged in a clockwise direction as an example, but it is not limited herein. In another embodiment, when the function options are arranged in a counterclockwise direction, a functional region originally corresponding to a marked state is the last functional region arranged in a counterclockwise direction as displayed on the operating interface, and the received first input signal is a counterclockwise rotating signal, positions of the function options are changed in a clockwise direction while hiding some foremost function option.

Referring to FIG. 5A and FIG. 5C, in an embodiment, a position of a function option (that is, the function option G1) is fixed on the operating interface 142. The function option G1 is a return key. In this case, when the received first input signal is a clockwise rotating signal, as shown in FIG. 5C, the function option G1 is stationary, positions of other function options G2 to G9 are changed in a counterclockwise direction while hiding some function options (that is, the function option G2 in the figure), other than the function option G1, located at the front end, and displaying some function options that are not displayed on the operating interface 142 originally (that is, the function option G9 in the figure).

Figure 6:
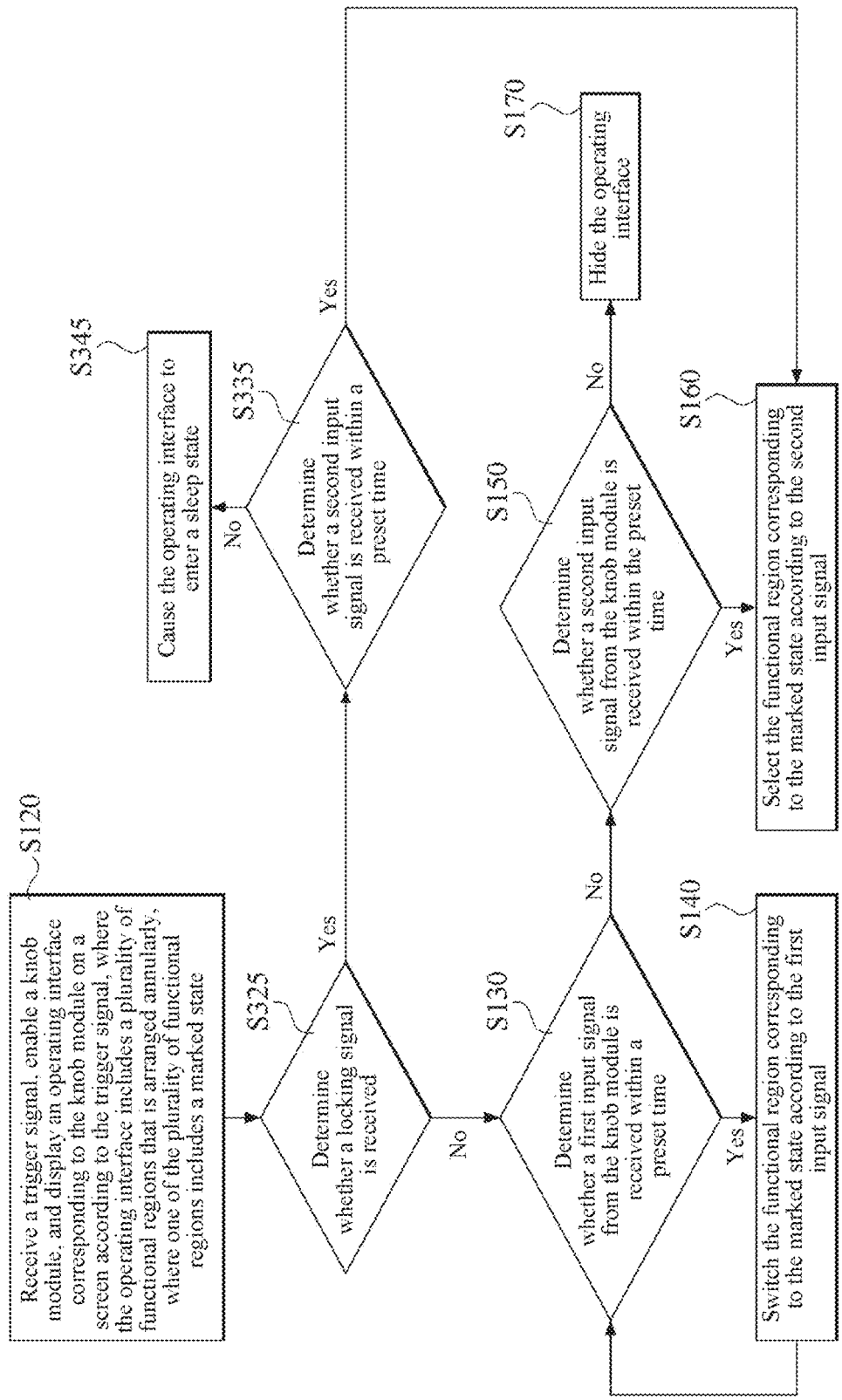
FIG. 6 is a flowchart of another embodiment of a control method according to the disclosure.

FIG. 6 is a flowchart of another embodiment of a control method according to the disclosure. Compared with the embodiment in FIG. 1, the control method of this embodiment further includes a determining step S325 after step S120 and before step S130, to determine whether a locking signal is received. In an embodiment, the locking signal is an input signal from the keyboard module 20, a touching signal from the touchpad 30, or a touching signal from the screen 14 that is touchable.

When the locking signal is received, in step S335, to determine whether the second input signal is received within a preset time. When the second input signal is received in the preset time, the process proceeds to step S160. When the second input signal is not received within the preset time after receiving the locking signal, the process proceeds to step S345, the operating interface is caused to enter a sleep state. In an embodiment, brightness or a contrast of the operating interface is also reduced to make the operating interface less obvious.

When the locking signal is not received, the process proceeds to the determining step S130. Subsequent steps are similar to those of the embodiment in FIG. 1. Details are not described herein again. The foregoing sleep state is ended by a wakeup signal. In an embodiment, the foregoing wakeup signal is a press-and-hold signal from the knob module 100.

By performing the control method provided in the disclosure, an operating interface displayed on a screen is used to clearly display options corresponding to a knob switch, to improve experience of operating the knob switch.

The above is merely exemplary embodiments of the disclosure, and does not constitute any limitation on the disclosure. Any form of equivalent replacements or modifications to the technical means and technical content disclosed in the disclosure made by a person skilled in the art without departing from the scope of the technical means of the disclosure still fall within the content of the technical means of the disclosure and the protection scope of the disclosure.

What is claimed is:

1. A control method, applied to an electronic device comprising a screen and a knob module, the control method comprising:
   receiving a trigger signal to enable the knob module, and displaying an operating interface corresponding to the knob module on the screen according to the trigger signal, wherein the operating interface comprises a plurality of functional regions that is arranged annularly, and the functional regions are configured to display a plurality of function options, wherein one of the functional regions shows a marked state;
   switching the functional region corresponding to the marked state according to a first input signal from the knob module;
   selecting the functional region corresponding to the marked state according to a second input signal from the knob module; and
   causing, when a locking signal is received and the second input signal is not received within a preset time after receiving the locking signal, the operating interface to enter a sleep state, and reducing a contrast of the operating interface.

2. The control method according to claim 1, further comprising: changing a position of the function options in a clockwise direction or a counterclockwise direction according to a third input signal from the knob module.

3. The control method according to claim 2, wherein the third input signal is a rotating signal.

4. The control method according to claim 2, further comprising: hiding a portion of the function options located at a front end in the clockwise direction or the counterclockwise direction when a quantity of the function options is greater than a quantity of the functional regions.

5. The control method according to claim 1, wherein the first input signal is a rotating signal.

6. The control method according to claim 1, wherein the second input signal is a pressing signal.

7. The control method according to claim 1, further comprising: hiding the operating interface when the first input signal or the second input signal is not received within a preset time after the knob module is enabled.

8. The control method according to claim 1, wherein the function options comprises a first-layer function option and a second-layer group option, and the second-layer group option is configured to open a plurality of second-layer function options.

9. The control method according to claim 1, wherein the function options comprises a value adjustment option, and when the value adjustment option is selected, a value adjustment interface corresponding to the knob module is displayed on the screen to replace the operating interface.

* * * * *